United States Patent [19]

Isozumi

[11] Patent Number: 5,027,664

[45] Date of Patent: Jul. 2, 1991

[54] ENGINE STARTER MOTOR WITH A PLANETARY SPEED REDUCTION GEAR

[75] Inventor: Shuzoo Isozumi, Himeji, Japan

[73] Assignee: Mitsubishi Denki Kabushiki Kaisha, Tokyo, Japan

[21] Appl. No.: 402,375

[22] Filed: Sep. 5, 1989

[30] Foreign Application Priority Data

Sep. 5, 1988 [JP] Japan ................................ 63-221913

[51] Int. Cl.[5] ......................... F02N 15/06; F16H 1/32

[52] U.S. Cl. ....................................... 74/7 E; 74/7 A; 310/83; 475/331

[58] Field of Search .................... 74/7 A, 6, 7 R, 7 E, 74/801; 290/38 C, 48; 310/83; 475/331

[56] References Cited

U.S. PATENT DOCUMENTS

| | | | |
|---|---|---|---|
| 1,933,534 | 10/1933 | Nardone | 74/7 C |
| 2,093,325 | 9/1937 | Lansing | 74/7 C X |
| 2,645,298 | 7/1953 | Hawkins et al. | 74/801 |
| 3,315,546 | 4/1967 | Fritsch | 74/801 |
| 4,412,457 | 11/1983 | Colvin et al. | 74/7 E X |
| 4,520,285 | 5/1985 | Isozumi et al. | 310/83 |
| 4,528,470 | 7/1985 | Young et al. | 310/78 |
| 4,590,811 | 5/1986 | Kasubuchi | 74/7 E |
| 4,852,417 | 8/1989 | Tanaka | 74/7 E |

*Primary Examiner*—Allan D. Herrmann
*Attorney, Agent, or Firm*—Sughrue, Mion, Zinn, Macpeak & Seas

[57] ABSTRACT

A starter motor with a planetary speed reduction gear in which a bolt for securing an electric motor unit to a front bracket passes at an outer circumference of an internal gear constituting a planetary speed reduction gear. The internal gear is provided in its outer circumference with a recessed groove with its bottom located on a radial axis passing through the center of one of the teeth of the internal gear and extending in the axial direction, and that a stem of the bolt is partly engaged by the recessed groove. Also, the internal gear may be provided in its outer circumference with an axially-extending threaded hole having a center located on a radial axis passing through the center of one of the teeth of the internal gear and formed in the end face of the frame, the threaded hole being located at a position in which its inner thread portion contacts with an imaginary circle having a radius equal to a thickness dimension of the rim portion necessary for the mechanical strength from the corner portion of the deddendum of the teeth, and that the threaded hole is thread-engaged by a tip threaded portion of the bolt.

2 Claims, 6 Drawing Sheets

ENGINE STARTER MOTOR WITH A PLANETARY SPEED REDUCTION GEAR

BACKGROUND OF THE INVENTION

This invention relates to an engine starter motor with a planetary speed reduction gear, and more particularly to improvements in internal gears of the planetary seed reduction gear for an engine starter motor.

One example of a conventional coaxial engine starter motor including a planetary speed reduction gear disclosed in Japanese Utility Model Laid-Open No. 63-71474 (Japanese U. M. Application No. 61-166198), for example, is illustrated in FIG. 1. The coaxial engine starter motor shown in FIG. 1 comprises a d.c. electric motor 1 having an armature rotary shaft 1*a*, an output rotary shaft 3 axially slidably supported and disposed at one end of the d.c. motor 1, to which the rotation of the armature rotary shaft 1*a* is transmitted through the drive force transmission mechanism including a planetary speed reduction gear 2, a pinion 4 disposed at the front end of the output rotary shaft 3, and a solenoid switch 5 disposed at the other axial end of the d.c. electric motor 1 for pushing and sliding the output rotary shaft 3 by a plunger rod 5*a* at the same time as the d.c. electric motor 1 is energized, the armature rotary shaft 1*a* of the d.c. electric motor 1 and the plunger rod 5*a* of the solenoid switch 5 are coaxially aligned.

In such the conventional coaxial engine starter, the front frame 6 housing the solenoid switch 5, the d.c. motor 1 and the drive force transmission mechanism are assembled and connected by two through bolts 7. That is, each of the through bolts 7 is inserted into a hole formed in a flange portion 5*c* formed around the front end portion of a case 5*b* of the solenoid switch 5, passes outside of the outer periphery of a yoke 1*b* of the d.c. motor 1 and the outer periphery of the internal gear 8 constituting the planetary speed reduction gear 2 and thread-engaged at its threaded end into the threaded hole of the front frame 6, whereby the case 5*b* of the solenoid switch 5 and the front frame 6 are pulled to each other to securely press the end of the yoke of the d.c. motor 1, thereby to connect the above three machine components to each other to provide a coaxial engine starter integrally assembled into one piece.

As above described, the through bolts 7 for connecting the solenoid switch 5, the d.c. motor 1 and the front frame 6 into one piece pass around the outer periphery of the internal gear 8 of the planetary speed reduction gear 2. Therefore, the dimension of the internal gear 8 is inevitably limited by the through bolts 7 as shown in FIG. 5. More particularly, as shown in FIG. 2 deddendum circle and the pitch circle of the internal gear 8 are determined by taking into consideration the mechanically necessary thickness of the rim thickness 1 between the bottom 8*b* and the outer peripheral surface 8*c* of the teeth 8*a* when the through bolt 7 is disposed adjacent to the outer periphery, so that the internal gear 8 cannot be made larger beyond this limitation.

Further, the conventional starter motor may include an internal gear integrally formed with the front frame 6. Even in this case, the size of the internal gear or the diameter of the dedendum circle or the pitch circle of the internal gear is similarly limited by the position of the threaded holes for receiving the through bolts which are formed in the axial direction from the end face of the front frame 6.

With such the limitation of the dimension of the internal gear 8 in the planetary speed reduction gear 2, the number of teeth is also limited, so that the degree of freedom in the speed reduction ratio design is significantly' and disadvantageously decreased. While this problem can be solved by locating the through bolts as for outside as possible, this arrangement makes the front frame having the threaded holes for receiving the bolts larger only for that purpose, resulting in a large and heavy front frame, and hence hindering the development of a small-sized, light-weight starter motor.

SUMMARY OF THE INVENTION

Accordingly, one object of the present invention is to provide an engine starter motor with a planetary speed reduction gear in which the degree of freedom can be increased without the need for the diameter of the internal gear constituting the planetary speed reduction gear to be increased and without the need for the position of the through bolts for connecting the motor unit to the front frame to be changed.

With the above object in view, the present invention resides in a starter motor with a planetary speed reduction gear in which a bolt for securing an electric motor unit to a front frame passes at an outer circumference of an internal gear constituting a planetary speed reduction gear. The internal gear is provided in its outer circumference with a recessed groove with its bottom located on a radial axis passing through the center of one of the teeth of the internal gear and extending in the axial direction, and that a stem of the bolt is partly engaged by the recessed groove.

Also, the internal gear may be provided in its outer circumference with an axially-extending threaded hole having its center located on a radial axis passing through the center of one of the teeth of internal gear and formed in end face of the frame, the threaded hole being located at the position in which its inner thread portion contacts with an imaginary circle having a radius equal to a thickness dimension of the rim portion neccessary for the mechanical strength from the corner portion of the deddendum of the teeth, and that the threaded hole is thread-engaged by a tip threaded portion of the bolt.

According to the engine starter motor with a planetary speed reduction gear of the present invention, when the internal gear is formed separately from the front bracket, the internal gear is provided in its outer circumference with recessed grooves, in a number corresponding to the number of the bolts, with their bottoms located on radial axes passing through the center of the selected teeth of the internal gear and extending in the axial direction. When the internal gear is to be installed, it is positioned so that a stem of the bolt is partly engaged by the recessed grooves formed in its outer circumference. This enables the outer diameter of the internal gear to be made substantially larger, so that the range in which the diameters of the deddendum circle and the pitch circle can be made broader.

Also, when the internal gear is integrally formed with the front bracket, the internal gear may be provided with an axially-extending threaded hole having its center located on a radial axis passing through the center of one of the teeth of internal gear and formed in an end face of the frame. The threaded hole is located at the position in which its inner thread portion contacts with an imaginary circle having a radius equal to a thickness dimension of the rim portion neccessary for the mechanical strength from the corner portion of the deddendum of the teeth, and that the threaded hole is thread-engaged by a tip threaded portion of the bolt. This means, when considering the position of the threaded hole as a reference, that the diameter of the imaginary circle, which is larger by the above dimension l than the deddendum circle of the internal gear, can be substantially increased, so that the range in which the diameters of the deddendum circle and the pitch circle can be made broader.

BRIEF DESCRIPTION OF THE DRAWINGS

The present invention will become more readily apparent from the following detailed description of the preferred embodiments of the present invention taken in conjunction with the accompanying drawings, in which.

DESCRIPTION OF THE PREFERRED EMBODIMENTS

Figure 1:
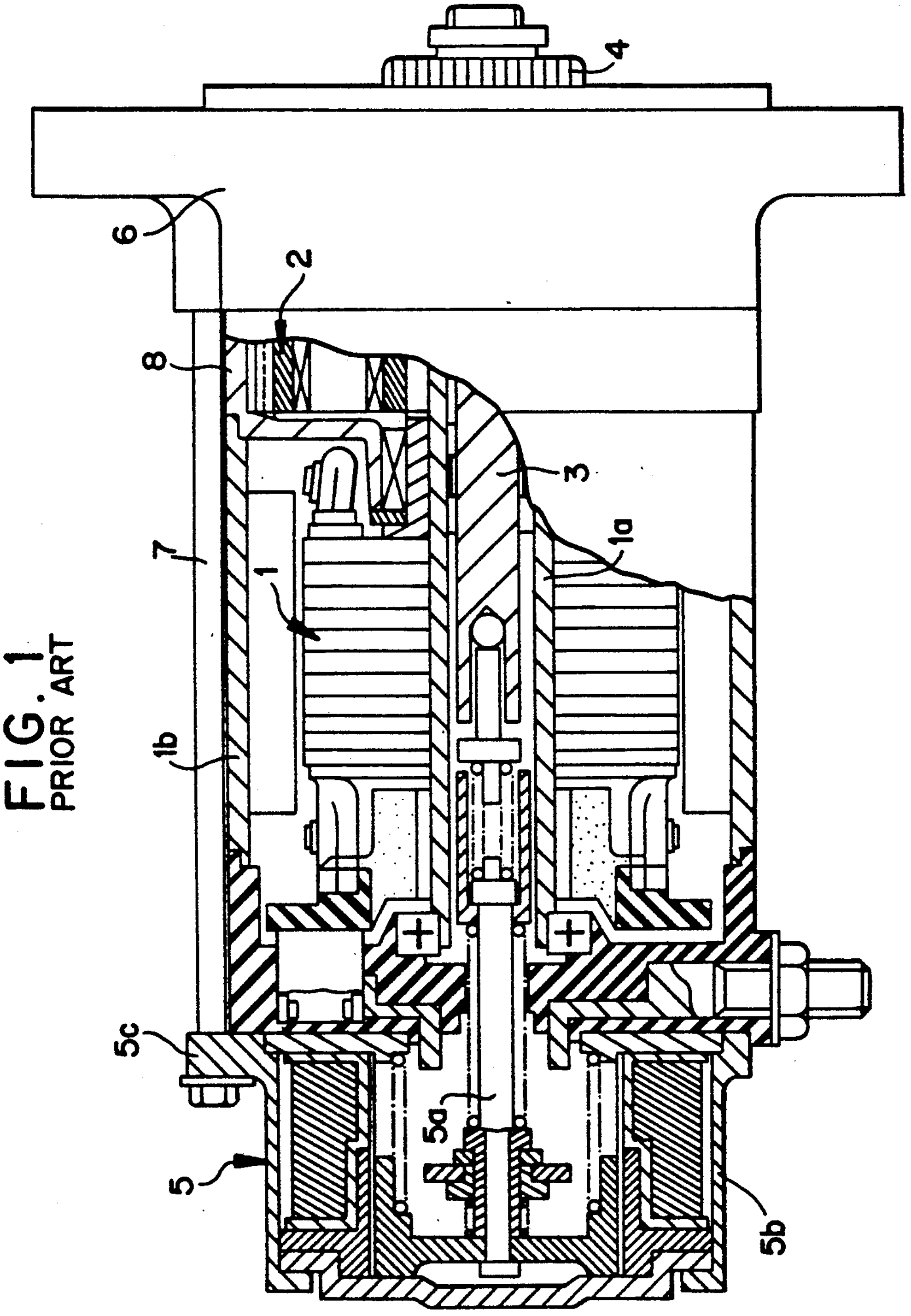
FIG. 1 PRIOR ART
FIG. 1 is a sectional side view of an engine starter motor with a planetary speed reduction gear to which the present invention can be applied.
Figure 2:
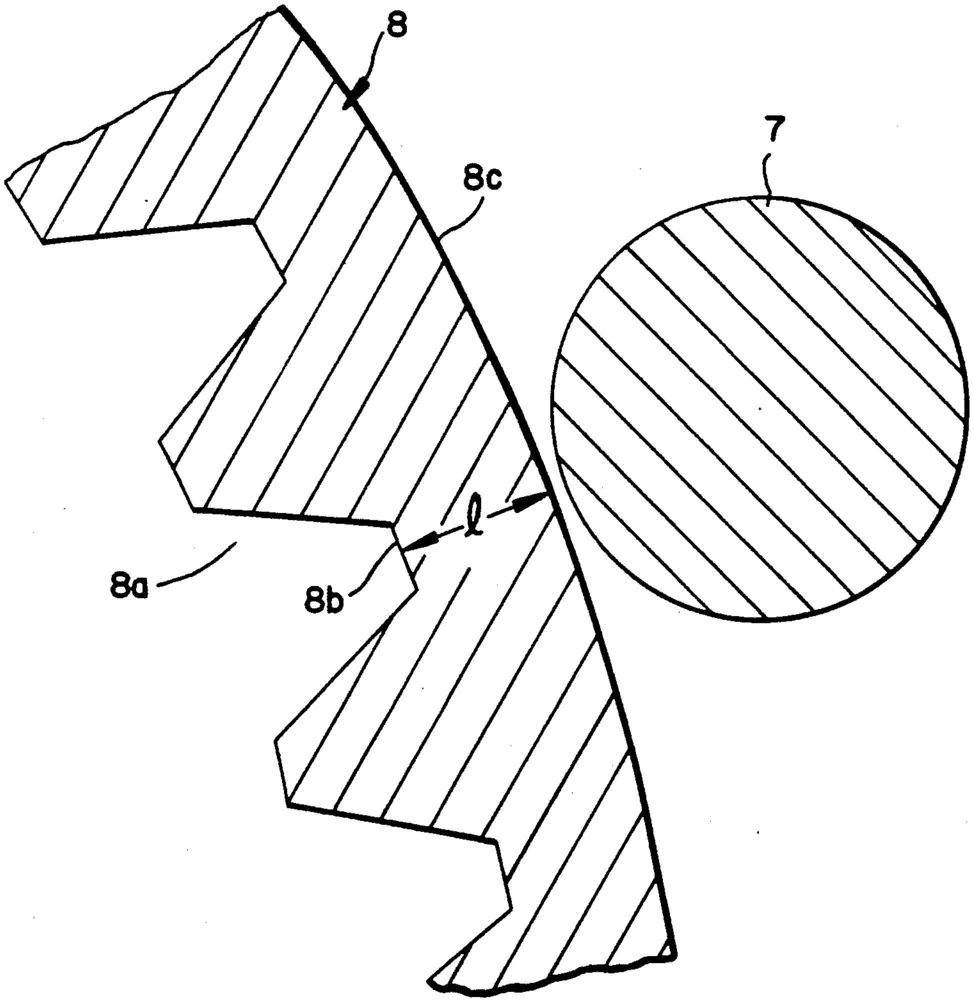
FIG. 2 PRIOR ART
FIG. 2 is a fragmental sectional view showing a positional relationship between the internal gear and the through bolt in a conventional engine starter motor.
Figure 3:
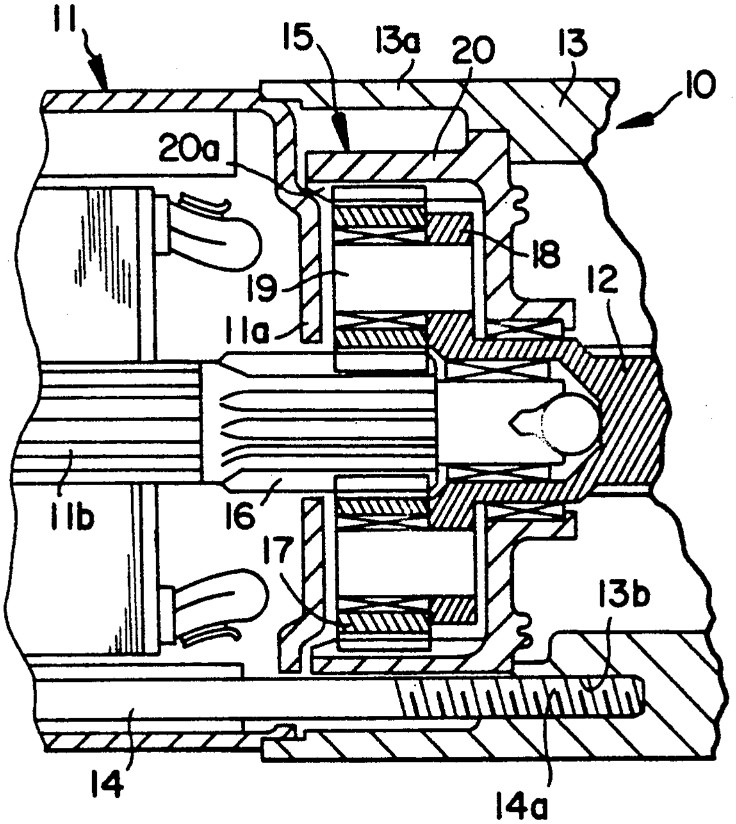
FIG. 3 is a fragmental sectional side view of an engine starter motor with a planetary speed reduction gear constructed in accordance with the present invention.

FIG. 3 illustrates one embodiment of an engine starter motor 10 with a planetary speed reduction gear. This starter motor 10 is of the bi-axial type, in which a solenoid switch (not shown) is disposed on one side of a d.c. electric motor 11, and a hook formed on a plunger of the solenoid switch is operatively connected to an over-running clutch mechanism (not shown) slidably fitted over an output rotary shaft 12. The front end portion of the d.c. motor 11 is in abutment with a flange portion 13*a* projecting in the axial direction from the outer portion of the end surface of a front machine frame 13 which is a front bracket, and a threaded portion 14*a* on the tip of the through bolt 14 inserted through the yoke inside of the d.c. motor 11 from behind is thread-engaged into the threaded hole 13*b* formed in the end face of the front frame 13, thus securely tightening the front frame 13 to the d.c. motor 11.

A planetary speed reduction gear 15 is disposed within a space defined by the flange portion 13*a* of the front frame 13. The planetary speed reduction gear 15 comprises a sun gear 16 which is formed on the outer cirumference of the end portion of an armature rotary shaft 11*b* projecting into the front frame 13 from the side central opening in the center bracket 11*a* integral with the yoke of the d.c. motor 11. The sun gear 16 is engaged by a plurality of planetary gears 17. The planetary gears 17 are rotatably supported on support shafts 19 secured on the bracket 18 integrally formed with the output rotary shaft 12, and the planetary gears 17 are in mesh with inner teeth gear or an internal gear 20 supported by the front frame 13.

Figure 4:
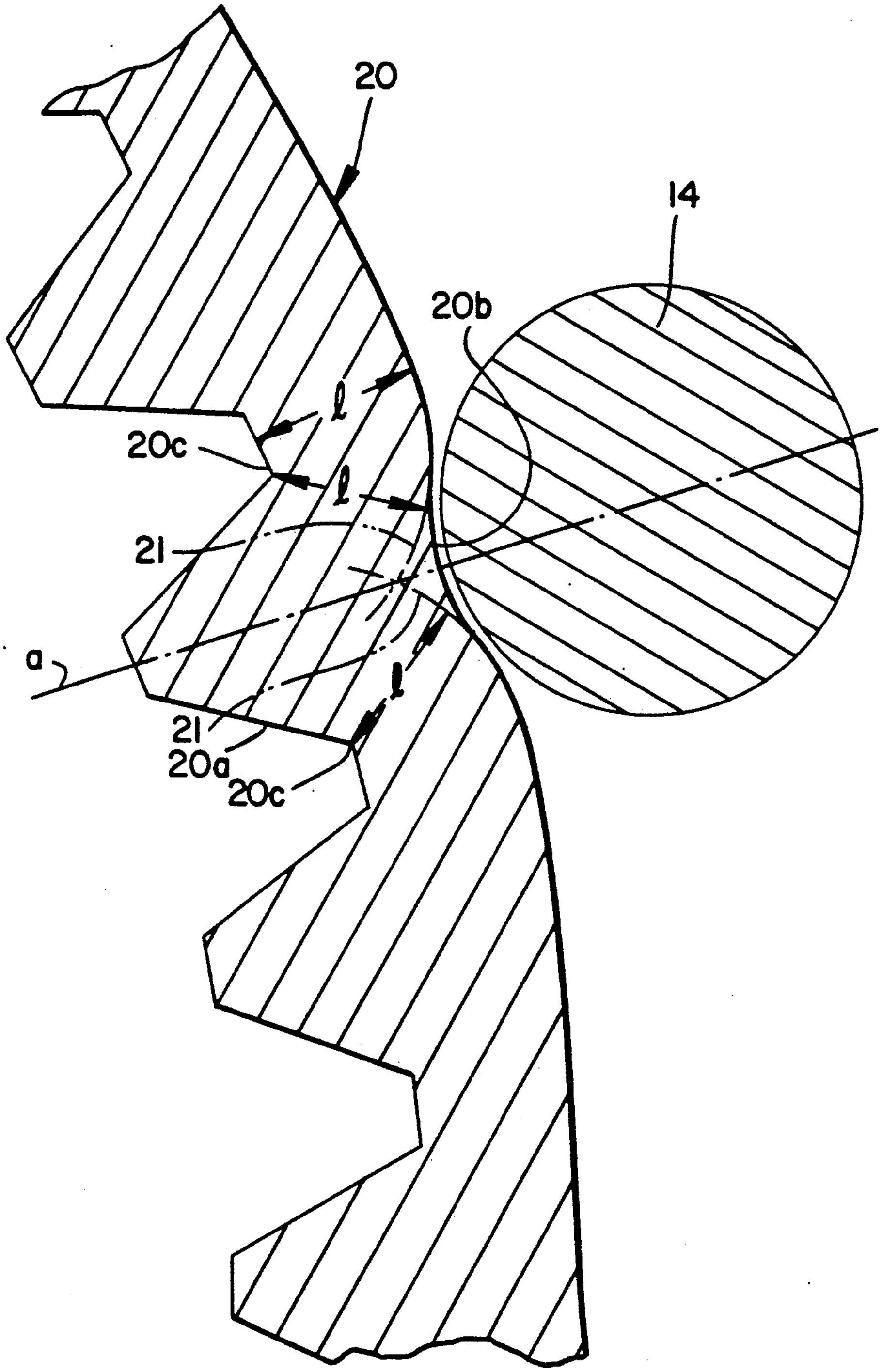
FIG. 4 is a fragmental sectional view showing a positional relationship between the internal gear and the through bolt in the engine starter motor shown in FIG. 3.

As best seen in FIG. 4, the internal gear 20 is provided at its outer circumference surface with recessed grooves 20*b* in a number corresponding to that of the through bolts 14. Each of the recessed grooves 20*b* extends in an axial direction and its bottom is located on a radial axis passing through the center of one of the teeth 20*a*. The recessed grooves 20*b* must not be positioned further inward than an imaginary circle 21 having a diameter equal to the thickness l of the rim as measured from a corner 20*c* of the deddendum of the inner teeth 20*a*. This is because if the recessed grooves 20*b* are larger or deeper than this, the base of the teeth 20*a* may be damaged due to the concentration of stressess.

The internal gear 20 thus constructed is positioned so that a stem of the through bolt 14 is partially received by the recessed grooves 20*b* formed in the outer circumferential surface of the internal gear 20. This means that, even when the positions of the through bolts are not changed, the internal gear 20 can be designed to have a substantially larger outer diameter substantially larger, whereby the range in which the diameters of the deddendum circle and the pitch circle of the internal gear 20 can be made larger can be increased, resulting in a larger degree of freedom in designing the speed reduction ratio.

Figure 5:
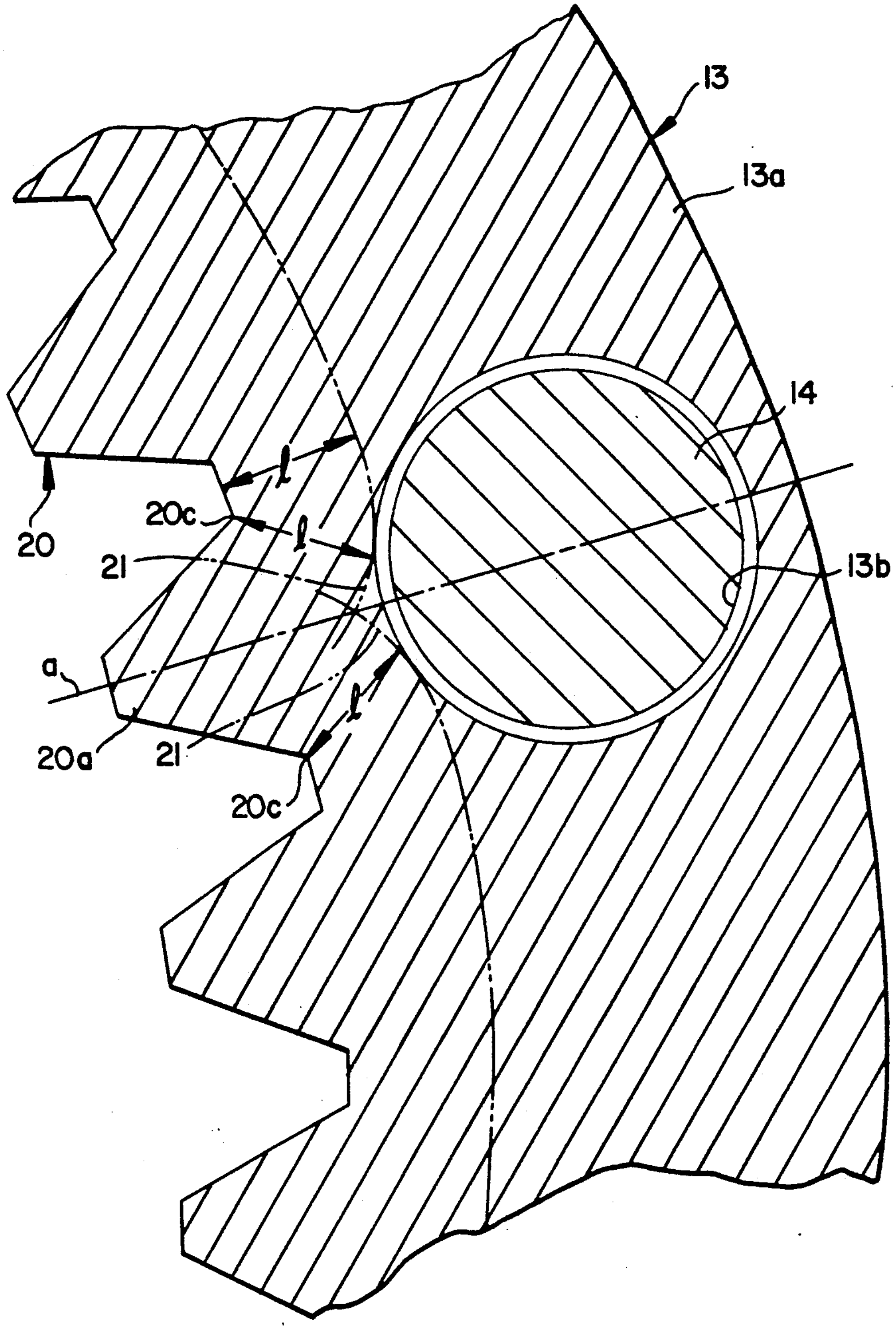
FIG. 5 is a fragmental sectional view showing a positional relationship between the internal gear and the through bolt in the engine starter motor of another embodiment of the present invention.
Figure 6:
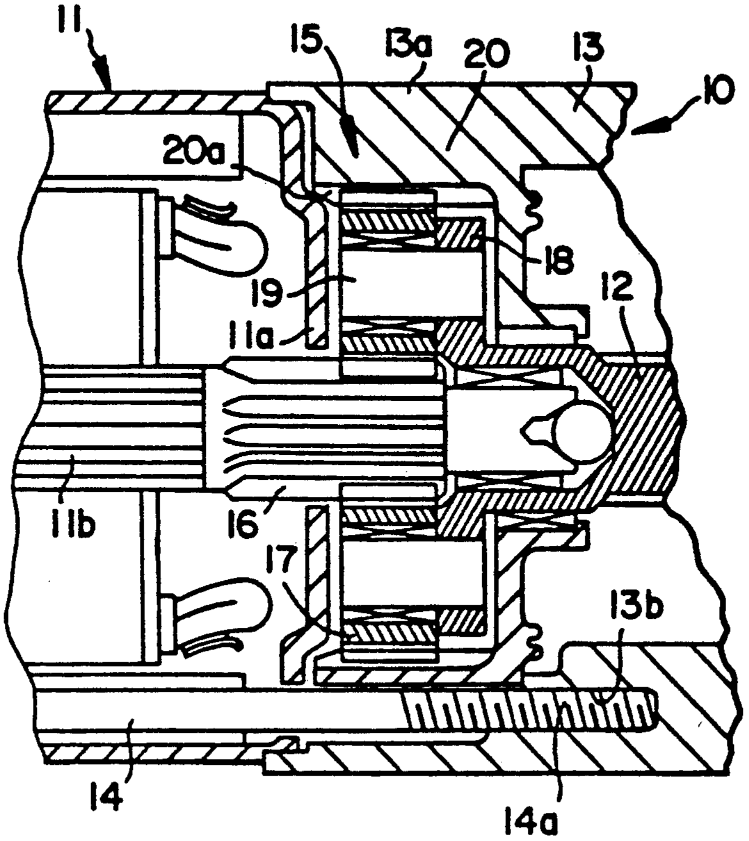
FIG. 6 is a fragmental sectional side view of the engine starter motor of FIG. 5.

FIG. 5 illustrates another embodiment of the engine starter motor 20 with a planetary speed reduction gear of the present invention. In this embodiment, the internal gear 20 is an integral part of the flange portion 13*a* of the front frame 13 and threaded holes 13*b* for receiving the through bolt are formed in this integral part. In this case, the boundary between the outer periphery of the internal gear 20 and the inner periphery of the flange portion of the frame 13 is at a position shown by a dot-and-dash line in FIG. 5 which is a position separated from the bottom of the teeth groove or deddendum by the distance l corresponding to the minimum required thickness of the rim portion of the internal gear 20. Thus, the threaded hole 13*b* is formed in such a manner that its center is positioned on a radial axis a passing through the center of one of the teeth 20*a* of the internal gear 20, that the threaded hole 13*b* extends in the axial direction, and that the inner threaded portion of the threaded hole 13*b* is in a tangential relationship with an imaginary circle 21 having its center on the corner 20*c* of the deddendum of the teeth 20*a* and having a radius equal to the necessary thickness l of the rim. With such the arrangement, even when the internal gear 20 is integrally formed with the front frame 13, and even when the the position of the through bolt 14 and accordingly the position of the threaded hole 13*b* for receiving the through bolt therein is not changed, the internal gear 20 can be designed to have a substantially larger outer diameter (shown by a dot-and-dash line in FIG. 5), whereby the range in which the diameters of the deddendum circle and the pitch circle of the internal gear 20 can be made larger can be increased, resulting in a large degree of freedom in selecting the speed reduction ratio.

In the above-described two embodiments, when the degree of selection freedom of the internal gear 20 need not be increased, the position of the through bolts can be made inside of the radial dimension of the starter motor, allowing the outside diameter of the front frame 13 to be smaller and allowing the through bolts 14 to extend inside of the yoke of the d.c. motor 11 as shown in FIG. 3, whereby the starter motor becomes easy to be mounted to an engine.

Although the above description has been made in terms of embodiments in which the d.c. motor and the front frame are connected by through bolts, this connection may be equally achieved by ordinary bolts inserted from holes formed in the flange portion of the yoke.

As has been described, according to the engine starter motor with a planetary speed reduction gear of the present invention, the positional relationship between the bolts for connecting the electric motor to the front frame and the internal gear of the planetary speed reduction gear is improved such that the bolts pass on a radial axis which passes through the center of the teeth of the internal gear, whereby the internal gear can be designed so that its outer diameter is radially outside of that of the conventional design, thus increasing the range in which the diameters of the deddendum circle and the pitch circle of the internal gear can be made larger, resulting in a larger degree of freedom in selecting the speed reduction ratio.

What is claimed is:

1. In a starter motor comprising an electric motor unit, a front bracket, an internal gear forming part of a planetary speed reduction gear, and a bolt for securing said electric motor unit to said front bracket, said passing at an outer peripheral portion of said internal gear, the improvement wherein:

said internal gear is provided in its outer circumference with a recessed groove with its bottom located on a radial axis passing through the center of one of the teeth of said internal gear and extending in the axial direction thereof, a stem of said bolt is partly engaged by said recessed groove, and a width of said recessed groove is less than a width of said one of said teeth.

2. In a starter motor comprising an electric motor unit, a front bracket, an internal gear forming part of a planetary speed reduction gear, and a bolt securing said electric motor unit to a machine frame in which said internal gear is integrally formed, the improvement wherein:

said internal gear is provided in its outer circumference with an axially-extending threaded hole having a center located on a radial axis passing through the center of one of said teeth of said internal gear and formed in an end face of said frame, said threaded hole being located at a position in which its inner thread portion contacts an imaginary circle having a radius equal to a thickness dimension of a rim portion necessary for the mechanical strength from the corner portion of the deddendum of said teeth, and said threaded hole is thread-engaged by a tip threaded portion of said bolt.

* * * * *